United States Patent
Kitamura

(10) Patent No.: US 7,519,851 B2
(45) Date of Patent: Apr. 14, 2009

(54) APPARATUS FOR REPLICATING VOLUMES BETWEEN HETEROGENOUS STORAGE SYSTEMS

(75) Inventor: Manabu Kitamura, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 538 days.

(21) Appl. No.: 11/054,636

(22) Filed: Feb. 8, 2005

(65) Prior Publication Data
US 2006/0179343 A1 Aug. 10, 2006

(51) Int. Cl.
G06F 11/00 (2006.01)

(52) U.S. Cl. .......................................... 714/6

(58) Field of Classification Search ................ 714/6, 714/8
See application file for complete search history.

(56) References Cited

U.S. PATENT DOCUMENTS

| | | | | |
|---|---|---|---|---|
| 5,504,861 A * | 4/1996 | Crockett et al. ............... | 714/13 |
| 5,544,347 A | 8/1996 | Yanai et al. | |
| 5,596,706 A * | 1/1997 | Shimazaki et al. ............ | 714/6 |
| 6,044,444 A * | 3/2000 | Ofek ........................... | 711/162 |
| 6,052,758 A * | 4/2000 | Crockett et al. ............ | 711/113 |
| 6,092,066 A | 7/2000 | Ofek | |
| 6,173,377 B1 * | 1/2001 | Yanai et al. .................. | 711/162 |
| 6,182,197 B1 * | 1/2001 | Dias et al. ................... | 711/151 |
| 6,185,655 B1 * | 2/2001 | Peping ......................... | 711/6 |
| 6,324,654 B1 * | 11/2001 | Wahl et al. .................... | 714/6 |
| 6,408,370 B2 | 6/2002 | Yamamoto et al. | |
| 6,449,731 B1 * | 9/2002 | Frey, Jr. ....................... | 714/9 |
| 6,463,501 B1 * | 10/2002 | Kern et al. .................. | 711/100 |
| 6,484,245 B1 | 11/2002 | Sanada et al. | |
| 6,594,745 B2 * | 7/2003 | Grover ........................ | 711/162 |
| 6,643,795 B1 * | 11/2003 | Sicola et al. .................. | 714/6 |
| 6,658,590 B1 * | 12/2003 | Sicola et al. .................. | 714/6 |
| 6,745,303 B2 * | 6/2004 | Watanabe ................... | 711/161 |
| 6,823,349 B1 * | 11/2004 | Taylor et al. ................ | 707/204 |
| 6,880,052 B2 * | 4/2005 | Lubbers et al. ............ | 711/162 |
| 6,947,981 B2 * | 9/2005 | Lubbers et al. ............ | 709/223 |
| 6,957,303 B2 * | 10/2005 | Fujimoto et al. ............ | 711/114 |
| 7,032,128 B2 * | 4/2006 | Nakano ....................... | 714/11 |
| 7,069,468 B1 * | 6/2006 | Olson et al. .................. | 714/7 |
| 7,082,506 B2 * | 7/2006 | Nakano et al. ............ | 711/162 |
| 7,111,189 B1 * | 9/2006 | Sicola et al. .................. | 714/6 |
| 7,120,740 B2 * | 10/2006 | Takase et al. .............. | 711/114 |
| 7,136,975 B2 * | 11/2006 | Ozaki et al. ................ | 711/162 |
| 7,137,042 B2 * | 11/2006 | Fujibayashi .................. | 714/47 |
| 7,155,546 B2 * | 12/2006 | Seto ........................... | 710/100 |
| 7,185,143 B2 * | 2/2007 | Tanaka et al. ............... | 711/114 |
| 7,188,272 B2 * | 3/2007 | Bartfai et al. ................. | 714/6 |
| 7,200,622 B2 * | 4/2007 | Nakatani et al. ........... | 707/202 |
| 7,225,307 B2 * | 5/2007 | Micka et al. ................ | 711/161 |

(Continued)

FOREIGN PATENT DOCUMENTS

EP 0672985 A1 9/1995

*Primary Examiner*—Robert Beausoliel
*Assistant Examiner*—Joshua P Lottich
(74) *Attorney, Agent, or Firm*—Mattingly, Stanger, Malur & Brundidge, PC

(57) ABSTRACT

In the remote mirroring system of this invention, the primary system has the capability of treating the volume in the remote storage system as a virtual storage devices in the primary storage system. The primary storage system realizes remote mirroring between different storage systems by copying data from the primary volume to the virtual volume(s) defined in the primary storage system. This enables remote mirroring between storage systems produced by the different vendors.

2 Claims, 9 Drawing Sheets

U.S. PATENT DOCUMENTS

| | | | |
|---|---|---|---|
| 7,228,380 B2 * | 6/2007 | Yamamoto et al. | 711/113 |
| 7,237,040 B1 * | 6/2007 | Kamvysselis | 709/248 |
| 7,240,235 B2 * | 7/2007 | Lewalski-Brechter | 714/6 |
| 7,278,049 B2 * | 10/2007 | Bartfai et al. | 714/6 |
| 7,293,048 B2 * | 11/2007 | Cochran et al. | 707/204 |
| 7,373,433 B2 * | 5/2008 | Vageline | 710/14 |
| 7,373,472 B2 * | 5/2008 | Bhasin et al. | 711/170 |
| 7,386,664 B1 * | 6/2008 | Roy et al. | 711/114 |
| 2002/0103968 A1 * | 8/2002 | Grover | 711/114 |
| 2003/0014585 A1 * | 1/2003 | Ji | 711/112 |
| 2003/0163553 A1 * | 8/2003 | Kitamura et al. | 709/219 |
| 2004/0068561 A1 * | 4/2004 | Yamamoto et al. | 709/224 |
| 2004/0078542 A1 * | 4/2004 | Fuller et al. | 711/172 |
| 2004/0088484 A1 * | 5/2004 | Yamamoto et al. | 711/114 |
| 2004/0139168 A1 * | 7/2004 | Tanaka et al. | 709/213 |
| 2004/0193820 A1 * | 9/2004 | Meiri et al. | 711/167 |
| 2004/0193945 A1 * | 9/2004 | Eguchi et al. | 714/6 |
| 2005/0102553 A1 * | 5/2005 | Cochran et al. | 714/6 |
| 2005/0114595 A1 * | 5/2005 | Karr et al. | 711/114 |
| 2005/0188253 A1 * | 8/2005 | Kawamura et al. | 714/6 |
| 2006/0010299 A1 * | 1/2006 | Zhang et al. | 711/162 |
| 2006/0047905 A1 * | 3/2006 | Matze et al. | 711/114 |
| 2006/0047928 A1 * | 3/2006 | Bhasin et al. | 711/162 |

* cited by examiner

Fig. 4

| PORT | LUN | LDEV |
|---|---|---|
| 0 | 0 | 0 |
| 0 | 1 | 1 |
| ⋮ | ⋮ | ⋮ |
| 0 | k | 100 |
| 1 | 0 | 101 |
| 1 | 1 | 102 |
| ⋮ | ⋮ | ⋮ |

| PORT | LUN | LDEV | JNL VOL |
|---|---|---|---|
| 0 | 0 | 0 | |
| 0 | 1 | 1 | |
| ⋮ | ⋮ | ⋮ | |
| 0 | k | 100 | |
| 1 | 0 | 101 | |
| 1 | 1 | 102 | |
| ⋮ | ⋮ | ⋮ | |
| -1 | -1 | 200 | 1 |

| PORT | STATUS |
|---|---|
| 0 | TARGET |
| 1 | EXTERNAL |

| LDEV | WWN | LUN |
|---|---|---|
| 301 | 10:04:e2:04:48:39 | 0 |
| 302 | 10:04:e2:04:48:39 | 1 |
| ⋮ | ⋮ | ⋮ |

| PRIMARY (601) | SECONDARY (602) | STATUS (603) |
|---|---|---|
| 1 | 301 | PAIR |
| 100 | 302 | PSUS |
| ⋮ | ⋮ | ⋮ |

| PORT (351) | WWN (352) | LUN (353) | LDEV (354) | MODE (355) |
|---|---|---|---|---|
| 0 | 10:04:e2:04:48:39 | 0 | 0 | 1 |
| 0 | 10:04:e2:04:48:39 | 1 | 1 | 1 |
| ⋮ | | ⋮ | ⋮ | ⋮ |
| 1 | 00:21:a2:31:22:b6 | 0 | 0 | 0 |
| 1 | 00:21:a2:31:22:b6 | 1 | 1 | 0 |
| ⋮ | | ⋮ | ⋮ | ⋮ |
| 1 | 00:21:a2:31:22:b6 | k | 100 | 1 |

APPARATUS FOR REPLICATING VOLUMES BETWEEN HETEROGENOUS STORAGE SYSTEMS

CROSS REFERENCE TO RELATED APPLICATIONS

The present invention is related to the following commonly owned, pending application U.S. application Ser. No. 10/603,076, filed Jun. 23, 2003, and is herein fully incorporated by reference for all purposes.

BACKGROUND OF THE INVENTION

The invention is related to storage systems in general, and more specifically to data replication in storage systems.

Some organizations copy data from primary site (production site) to one or more secondary sites in preparation for data collapse or disaster. When the primary site fails due to some trouble such as disaster and the primary storage becomes unavailable, computer systems start their jobs using data in secondary storage.

U.S. Pat. Nos. 5,544,347 and 6,408,370 (incorporated herein by reference for all purposes) disclose remote mirroring methods in which the primary storage systems transfer data to the secondary storage systems. These references describe a system in which both the primary and secondary storage systems each has the same remote mirroring functions as in the other. The primary storage system transfers data to be mirrored by attaching additional information that is needed for remote mirroring. The secondary storage system (e.g., SECONDARY DATA DESTAGING UNIT in U.S. Pat. No. 6,408,370) attempts to preserve the write order of the remote copy data by interpreting the additional information that is attached to the remote copy data.

European Patent publication EP 0672985A1 discloses another remote mirroring method. In the system in EP 0672985A1, host computers take charge of mirroring data between the primary and secondary sites. This method, however, burdens host computers with the workload required to effect the data mirroring functionality.

SUMMARY OF THE INVENTION

The present invention provides a way to mirror data between heterogeneous storage systems without a host computer's intervention. A remote mirroring system according to the present invention is composed of a primary storage system, a primary host, a secondary storage system, and a secondary storage system. Each of the primary and secondary storage systems is a different kind of storage system (e.g. manufactured by the different vendors). The primary storage system has the means for treating logical devices in the secondary storage as if they were the logical volumes in the primary storage system. When mirroring data from the primary storage volume to the secondary storage volume, the primary storage system copies data from the primary storage volume to the virtual volume. When the primary site fails, the secondary host detects the failure and does the appropriate process in accordance with the cause of failure.

BRIEF DESCRIPTION OF THE DRAWINGS

Aspects, advantages and novel features of the present invention will become apparent from the following description of the invention presented in conjunction with the accompanying drawings, wherein:

FIG. 4 shows a volume configuration table;

FIG. 5 shows another volume configuration table;

FIG. 6 shows a port configuration table;

FIG. 7 shows a virtual volume configuration table;

FIG. 8 shows a pair configuration table;

FIG. 9 shows a volume configuration table in the secondary storage system;

DESCRIPTION OF THE SPECIFIC EMBODIMENTS

Figure 1:
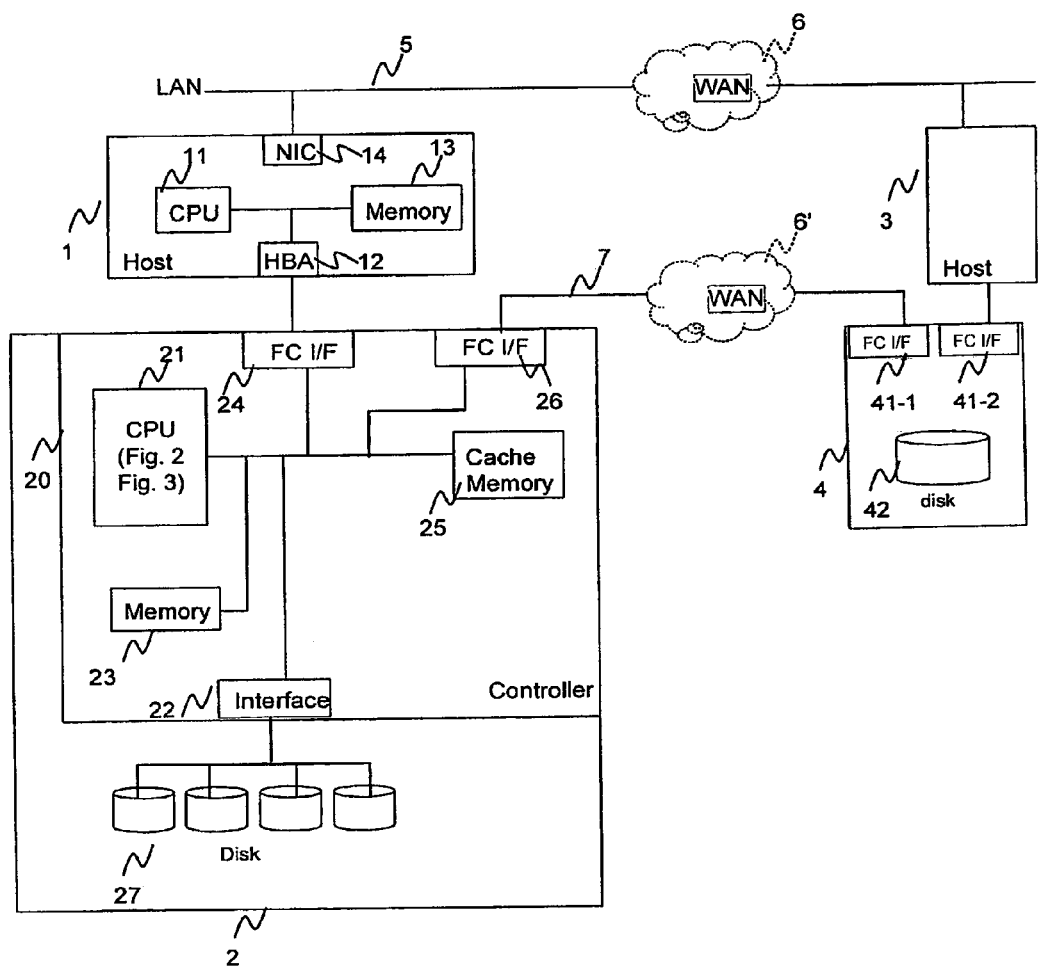
FIG. 1 is a generalized block diagram of an embodiment of a system according to the present invention.

FIG. 1 shows an example of a remote copy system in which the method of this invention applied. A primary host 1 includes a CPU 11, an HBA 12 (host bus adapter), a memory 13, and a Network Interface Controller (NIC) 14. A secondary host 3 is provided. The secondary host is typically configured similarly to the primary host 1.

A primary storage 2 comprises a Disk controller 20 and disks 27 (physical storage devices). In accordance with the present invention, the primary storage 2 provides remote mirroring functionality. The Disk controller 20 in turn comprises a CPU 21, a backend interface 22, a memory 23, Fibre Channel interfaces (FC I/F) 24 and 26, and a cache memory 25. The CPU 21 executes program code to provide the functionality shown in the logical block diagrams of FIGS. 2 and 3, discussed below. Additional processing performed by the CPU 21 is shown in the flow charts of FIGS. 10-16, discussed below.

A secondary storage 4 comprises a disk controller (not shown) and disks (physical storage devices) 42. An aspect of the present invention is that the secondary storage system need not be provided with remote mirroring functionality. Instead, the secondary storage 4 has the ability to temporarily prevent write operations from specific host computers or other storage systems (such as primary storage 2; this capability is hereinafter called "write protect function".

A LAN 5 (local area network) connects the primary host 1 to the secondary host 3. FIG. 1 also shows that the communication between the primary host 1 and the secondary host 3 can include a WAN 6 (wide area network) and for this reason WAN 6 is indicated in phantom lines. The primary storage 2 and secondary storage 4 are connected via a Fibre Channel cable 7. However, the connection can also include a WAN 6', as indicated by the phantom lines.

The primary host 1 will execute computer program applications which access data stored in the primary storage 2. The primary host 1 will issue read and write requests to the primary storage 2, and the primary storage 2 will service those read and write requests by accessing the physical storage 27. Similarly, the secondary host 3 will issue I/O requests to the secondary storage 4. The secondary storage 4 will service the I/O requests by accessing its physical storage 42.

Figure 2:
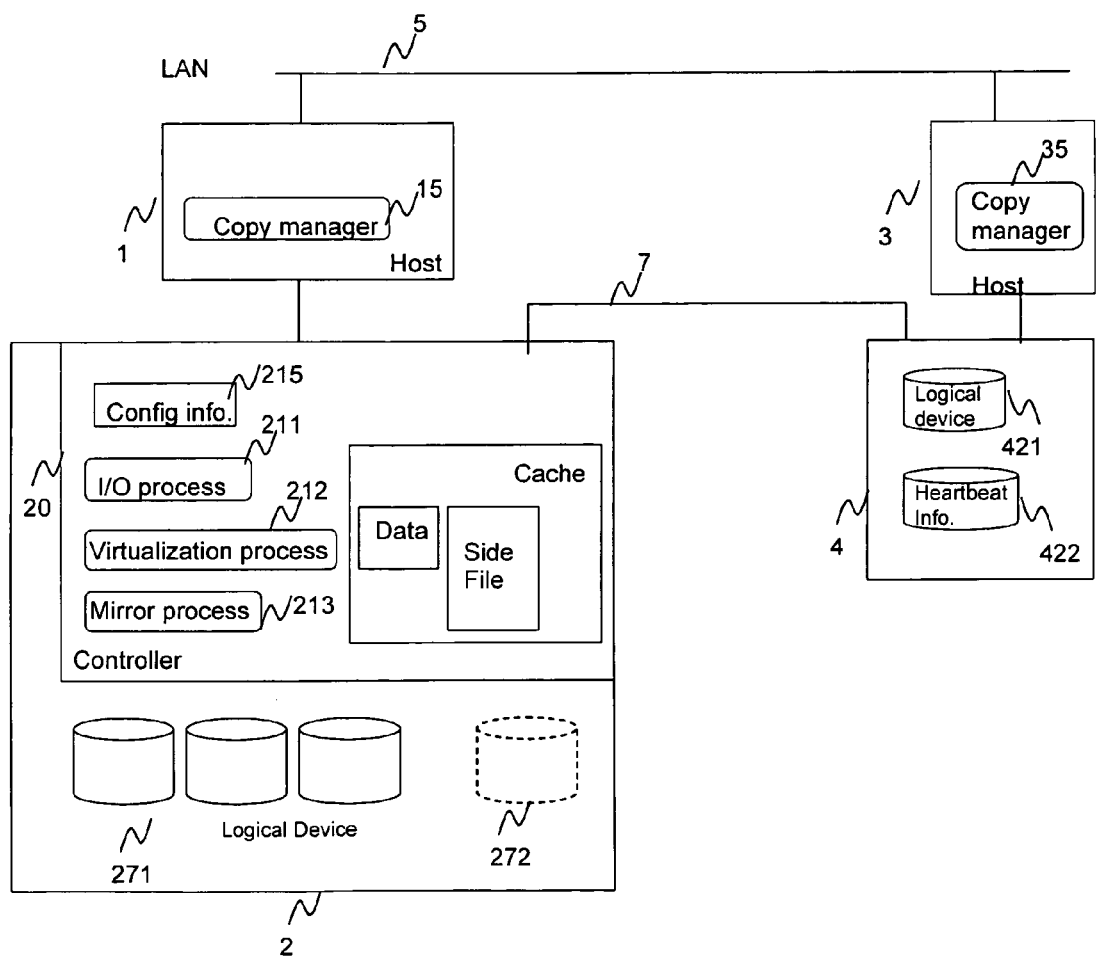
FIG. 2 is a generalized logical block diagram of an embodiment of a system according to the present invention, utilizing sidefile processing.

FIG. 2 shows a functional diagram of the remote copy system, showing the functionality that is provided in the various components shown in FIG. 1. A Copy manager 15 function is provided in the primary host 1. A similar Copy manager 35 function is provided in the secondary host 3.

In the present embodiment, the primary storage 2 and secondary storage 4, each creates one or more logical devices (LDEVs) based on its respective physical storage devices 27 and 42. The primary host 1 and the secondary host 3 issue I/O requests directed toward the logical devices. Also, remote mirroring between the primary storage 2 and secondary storage 4 is done in each logical volume.

In another embodiment, the concept of logical device might not be used in the storage systems. In this case, each host 1, 3 may access its respective disks 27 and 42 directly. In this case, the remote mirroring between the primary storage 2 and secondary storage 4 is done in each disk 27 and 42.

Three kinds of processes reside in the disk controller 20: There is an I/O process 211 which processes host I/O request from primary host 1. A Mirror process 213 copies write data to the secondary storage 4 then mirrors logical devices in the primary storage 2. A virtualization process 212 creates virtual volumes 272 using the storage devices 42 located in the secondary storage 4. By using the virtualization process, the disk controller 20 treats the logical devices in the secondary storage 4 as if they were logical volumes in the primary storage 2. In addition, the disk controller 20 manages the configuration information 215 to manage logical devices (LDEVs) and pairs of logical volumes for remote mirroring. Details of the configuration information 215 are described later.

External Storage Connecting Function

By operation of the virtualization process 212, the primary storage 2 creates virtual volumes 272 using the storage devices 42 contained in the secondary storage 4. This function is hereinafter referred to as the "external storage connecting function." The followings terms and definitions are used in the following discussion:

internal volume—This refers to a logical device where the corresponding physical storage device is located in the primary storage 2.

external volume—This refers to a logical device where the corresponding physical storage device is located in the secondary storage 4.

virtual volume—This refers to a logical device where the data exists in the external volume. Each virtual volume is associated with one of the external volumes.

map external volume to virtual volume—The term "map" means that the virtualization process 212 creates a virtual volume that is associated with an external volume. After the mapping procedure, when the primary host 1 or the mirror process 213 in the primary storage 2 issues I/O request to an address (logical block address, LBA) of the virtual volume, the virtualization process 212 translates the I/O request and issues an I/O request to the address (LBA) of the mapped external volume.

Remote Mirroring

There are a couple of methods to mirror data from the primary storage 2 to the secondary storage 4. Two techniques are described:

The "cache sidefile method" takes data to be mirrored and stores it to cache as a "sidefile" (see FIG. 2). The sidefile is similar to a queue structure (FIFO). The data in the sidefile is managed with a sequence number so that the write order of the data can be preserved before it is sent to the secondary storage system 4. The sidefile is written to the secondary storage system 4 in accordance with the order of the sequence number. Since the write order is already preserved in the primary storage system 2, a secondary storage system 4 of the present invention does not have to perform a write-order determination. Consequently, any suitable storage system component can be used as the secondary storage system 4.

Figure 3:
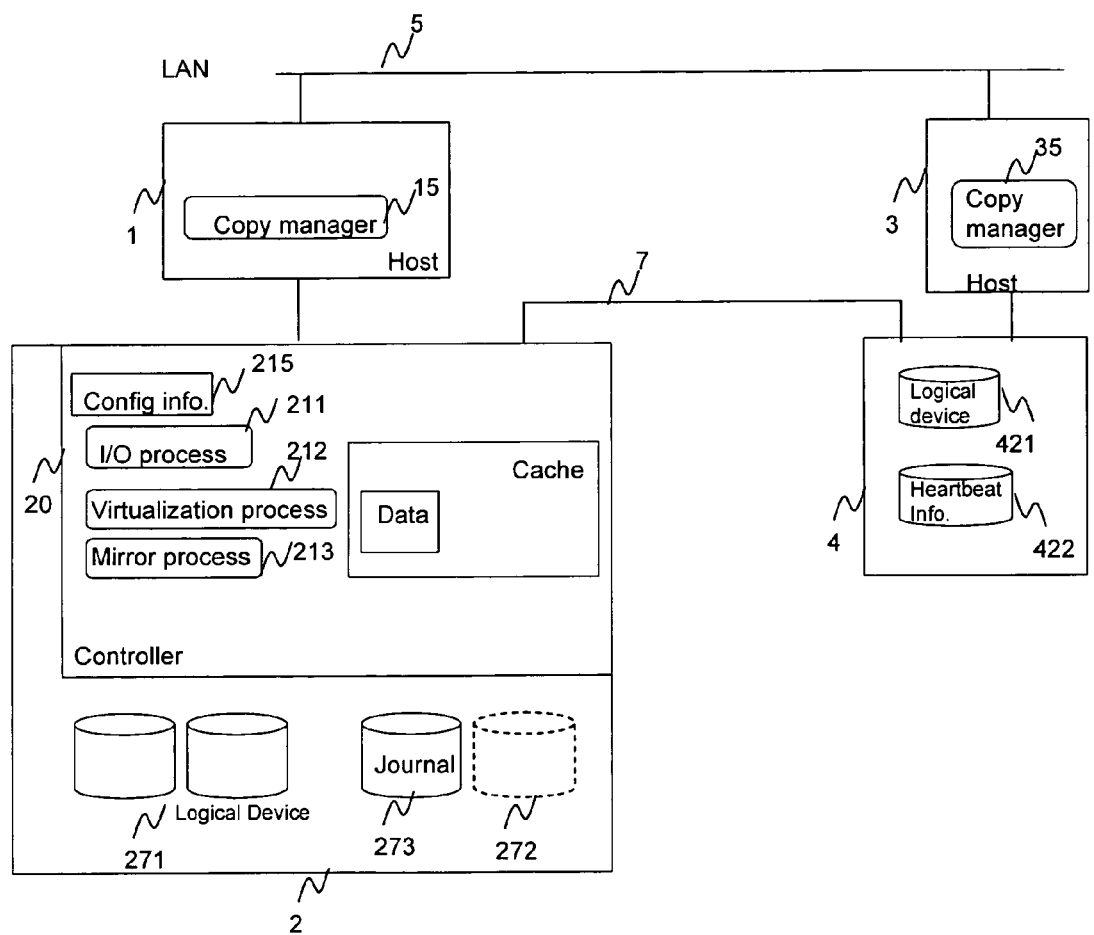
FIG. 3 is a generalized logical block diagram of an embodiment of a system according to the present invention, utilizing journal volume processing.

The "journaling method" takes data to be mirrored and stores it to one of the storage volumes designated as a "Journal (JNL) volume" (see FIG. 3). Actually, one or more logical devices can be designated for use as the Journal volume. The data is called the "Journal". Similar to the cache sidefile method, each Journal is managed with a sequence number to preserve the write order when it is written to the secondary storage 4. An example of this technique is discussed in commonly owned, co-pending U.S. application Ser. No. 10/603,076, filed Jun. 23, 2003.

Volume Configuration

FIGS. 4-8 show typical configuration information that the primary storage 2 maintains. FIG. 4 show a volume configuration table 300 to manage the association among port identification numbers 301, LUNs 302, and logical device (LDEV) numbers 303. This table 300 is used when the cache sidefile remote mirroring method is employed. The primary storage 2 creates (defines) one or more logical devices using a plurality of disks 271. Each logical device has its unique number which is called LDEV number. Also, when the primary host 1 accesses a logical device, it designates a port identification number (e.g., in accordance with Fibre Channel protocols; WWN or the alternatives can be used) and a LUN (Logical Unit Number).

FIG. 5 shows a volume configuration table 300' when the journaling remote mirroring method is used. When the journaling method is used, the primary storage 2 has to maintain a journal volume. When the value of the column "JNL VOL" 304' is 1, it means that the corresponding LDEV in that row is used for storing journal data (e.g., row 311 in FIG. 5). When the LDEV is used for storing journal data, port 301' or LUN 302' is not necessarily assigned to the LDEV (in another embodiment, they may be assigned to the LDEV). In this case, a value of "−1" (e.g., 0xFFFFFFFF in hexadecimal) is stored in the column port 301' and LUN 302'.

FIG. 6 is the port configuration table 400. Each FC I/F 24 or 26 (FIG. 1) operates in one of two kinds of states:

TARGET: when the status of FC I/F is TARGET, the FC I/F is used for receiving host I/O requests EXTERNAL: when the status of FC I/F is EXTERNAL, the FC I/F is connected to the secondary storage 4 and is used for external storage connecting function.

In the primary storage 2 of the present embodiment, for example, port number 0 corresponds to the FC I/F 24, and port number 1 corresponds to the FC I/F 26. Therefore, FC I/F 24 is used for receiving host I/O requests, and FC I/F 26 is connected to the secondary storage 4 to use the external storage connecting function.

FIG. 7 shows the virtual volume configuration table 500. The column identified as LDEV 501 shows the LDEV number of the virtual volume that is created in the primary storage 2. The columns identified as WWN 502 and LUN 503 show the WWN (World Wide Name) and LUN of the external storage device, respectively.

FIG. 8 shows the pair configuration table 600, which manages the relation between primary and secondary volume for the purpose of remote mirroring. The primary volume field 601 identifies the source volume. The data in the source volume is mirrored to the secondary (target) volume. In the present embodiment, source volume is an internal volume in the primary storage 2. The secondary volume field 602 identifies the target volume of the mirroring operation, to which data in the primary volume is mirrored. In the present embodiment, the secondary volume is in the secondary storage 4. The volume pair field 603 designates that status of the volume pair.

The volume pair field 603 indicates the status of the remote copy process. The statuses include:

COPY: The remote mirroring method initially copies the image of a source volume in the primary storage 2 to a secondary storage volume in the secondary storage 4, which is performed sequentially from the beginning block of the source volume to the end block. This is referred to as the "initial copy". When the status is COPY, it means that the initial copy is in progress.

PAIR: Concurrent with the COPY operation, an update copy process is initiated. When the primary host 1 writes data to the primary storage volume, the write data is copied (mirrored) to the secondary volume. This copy operation is referred to as an "update copy". The PAIR status shows that the initial copy has completed and that only update copy operations are performed.

PSUS: This stands for "Pair Suspend". In pair suspend state, the update copy stop. When the primary host 1 writes data to the primary storage volume, the data is not copied to the secondary storage volume. Instead, the primary storage system 1 maintains bitmap that records the location (LBA) of the primary storage volume of where the data is written.

PSUS_E: This stands for "Pair Suspend Error". This state indicates that the remote mirroring operation is stopped due to some kinds of failure, such as when Fibre Channel cable 7 is disconnected and data cannot be transferred from the primary storage 2 to secondary storage 4.

The pair configuration table 600 is primarily maintained by the primary storage 2, but the copy managers 15 and 35 have access to this information, for example by having a copy of the table 600.

Secondary Storage Configuration

Secondary storage 4 is provided with a function to temporarily prevent write I/O requests from the secondary host 3 or from the primary storage 2. FIG. 9 shows a secondary volume configuration table 350 that the secondary storage 4 maintains. The information is also available to the copy managers 15 and 35, for example, by keeping a copy of the table. Columns 351, 353, and 354 are similar to the fields in the volume configuration table 300 in the primary storage 2.

The column WWN 352 in the table 350 stores the worldwide name of the port. In the column "Mode" 355, the secondary storage 4 can indicate whether the volume that is identified by the columns 351-354 is to be write-protected or not. If the value of the Mode 355 is "1," for example, then the host computers or the storage systems that are connected to the port can write data to that volume. On the other hand, if the value of the Mode 355 is "0," for example, then the hosts or the storage systems connected to the port cannot write data to that volume.

In the present embodiment, volumes in the secondary storage 4 can be accessed from a plurality of FC I/Fs 41-1 and 42-2 (FIG. 1). The mode can be specified in each port. For example, the volume whose logical volume number (354) is 0 is connected to two FC I/Fs whose port numbers are 0 and 1 (e.g., see rows 356 and 357, FIG. 9). Note that for this example, the FC I/F whose port number is 0 corresponds to the FC I/F 41-1 in FIG. 1 and the FC I/F whose port number is 1 corresponds to the FC I/F 41-2. In this case, if a host (or primary storage 2) is connected to FC I/F 41-1, the host or the primary storage 2 can write data via the FC I/F. But host computers which are connected with the FC I/F 41-2 cannot write data to the volume since the write operation to the LDEV 0 from the FC I/F 41-2 is write-protected.

Other techniques can be used in the storage system to control limiting access to it from a host computer or storage system. For example, commonly owned U.S. Pat. No. 6,484,245, incorporated herein by reference for all purposes, discloses another such method. In this case, instead of employing a secondary volume configuration table 350, the secondary storage system 4 may maintain pair of each LDEV and the list of WWN of the hosts/storages that the access to the LDEV is allowed.

Remote Mirroring Process Flow

Figure 10:
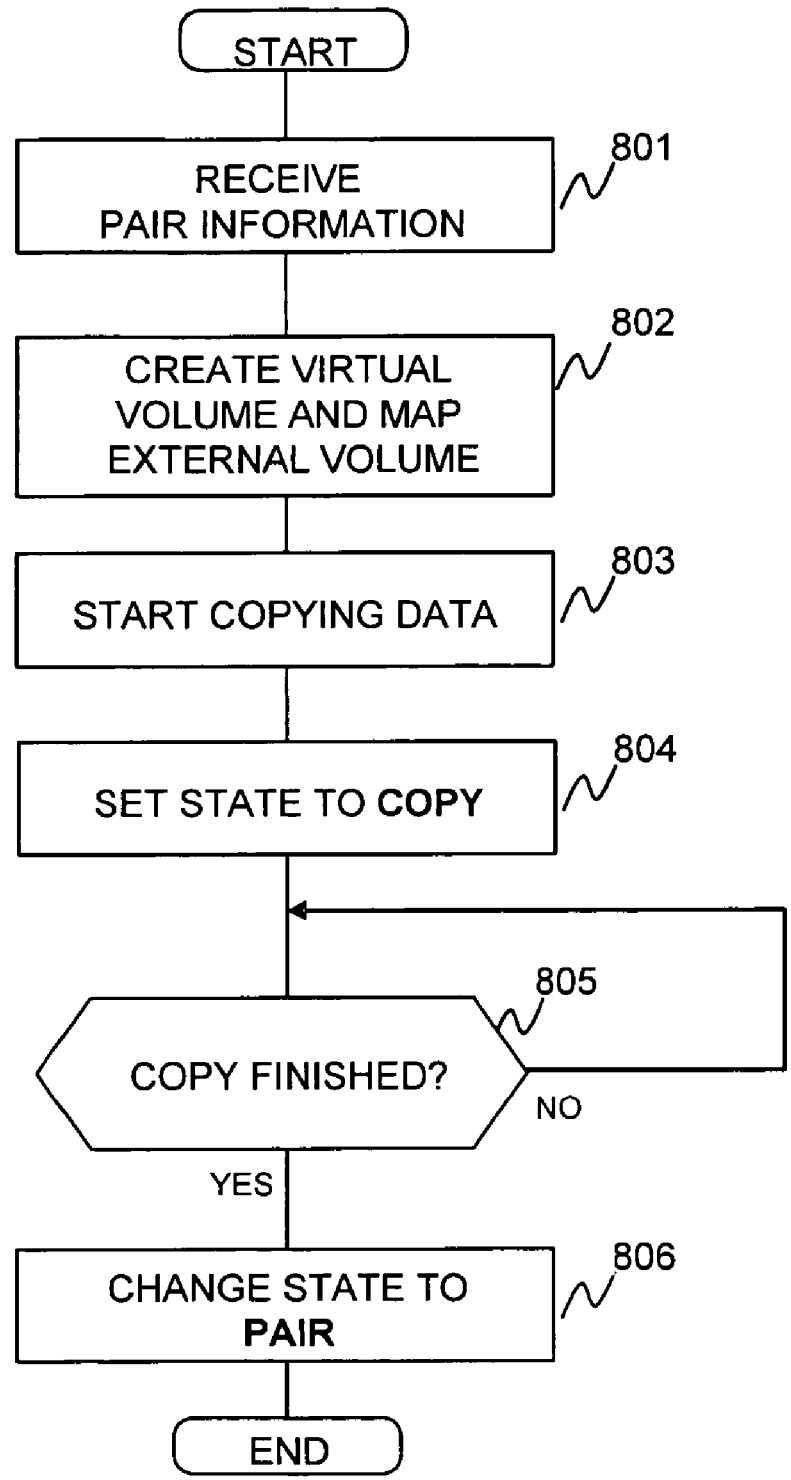
FIG. 10 highlights initial actions taken to set up for remote data mirror operations.

When the remote mirroring process is initiated, the process creates a volume pair between a primary volume in the primary storage 2 and a secondary volume in the secondary storage 4. One or more such volume pairs can be created. FIG. 10 shows the process flow for pair creation.

A user instructs the copy manager 15 in the primary host 1 to issue a request to create a remote mirroring volume pair (pair-create request). Upon receiving a pair-create request, the copy manager 15 passes the identification information of the primary volume and the secondary volume (such as LDEV number, or a pair of port number and WWN) to the primary storage 1. The following actions are performed:

Step 801: The primary storage 2 receives the pair-create request from the copy manager 15 with the identification information of the primary and secondary volumes.

Step 802: Based on the received secondary volume identification information, the primary storage 2 creates a virtual volume. The virtual volume is mapped to the secondary volume.

Step 803: The initial copy process is started. Concurrent with the initial copy, update copy is also started. Detailed processing of the update copy process is explained in FIG. 11.

Step 804: The primary storage 2 registers the volume pair information into the pair configuration table 600 and sets the pair status 603 to COPY.

Step 805: The primary storage 2 waits for the completion of the initial copy operation.

Step 806: The pair status is changed to PAIR when the initial copy operation has completed.

Figure 11:
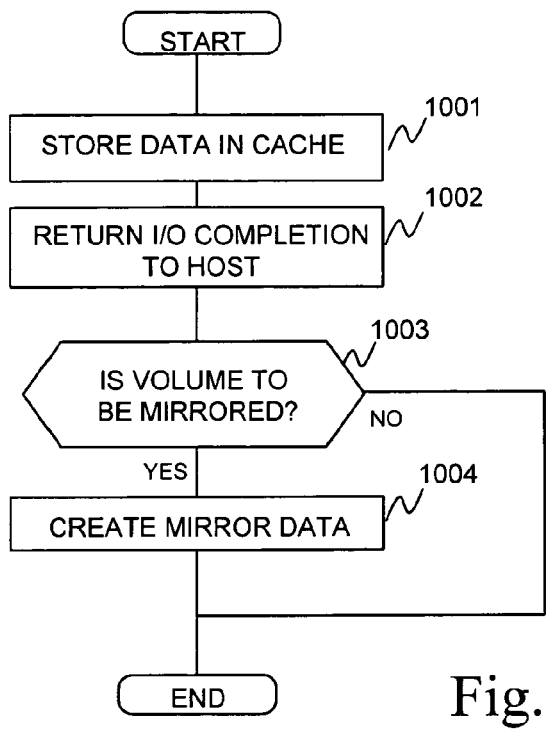
FIGS. 11 and 11A highlight processing performed for a remote mirroring operation.
Figure 11A:
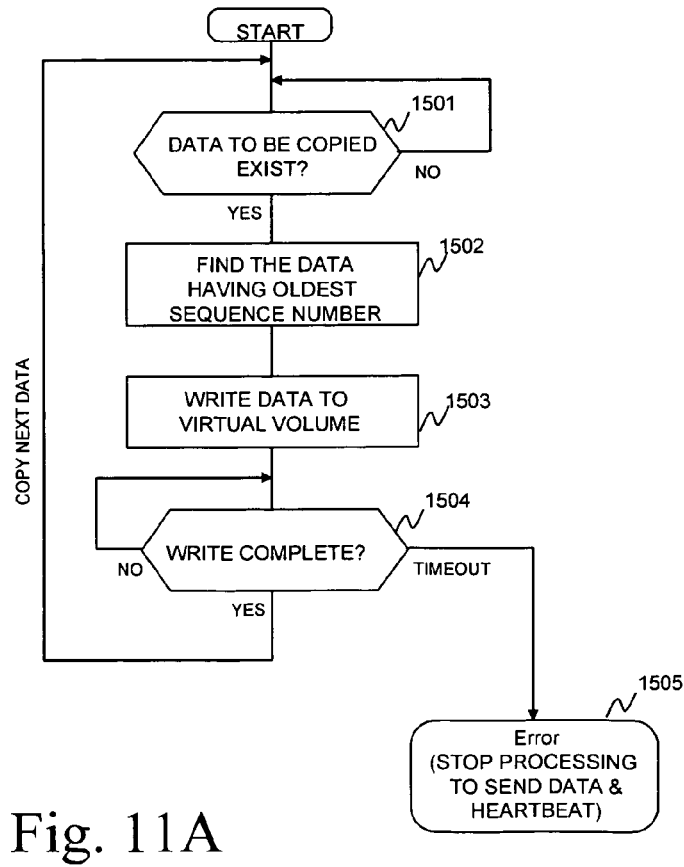

FIGS. 11 and 11A show the flow of operation of the update copy process when host 1 writes data to the primary storage 2. In a step 1001, the primary storage receives a write request from the host 1. The write request has write data that is associated with the request. The controller 20 will store the write data into the cache 25. The cached write data will then be written to the target volume in the primary storage 2. In a step 1002, the primary storage 2 returns a suitable I/O completion indication to the host 1 to indicate that the write request has been serviced.

In a step 1003, a check is made in the pair configuration table 600 to determine whether the target volume of the write request is paired with a remote volume. If it is, the process proceeds to step 1004; meaning that the target volume is mirrored at the secondary storage 4. If not, the process ends; meaning that there is no mirroring for the target volume.

It can be appreciated that steps 1002 and 1003 constitute an asynchronous operation. That is, the primary storage 2 acknowledges completion of the requested I/O before completing the remote copy operation (see step 1004 below).

In a step 1004, the write data is processed in the primary storage 2 and is subsequently copied to the secondary storage 4. Practically, when the journaling method is used, the data is copied and stored into journal volume with the sequence number. Or when the cache sidefile method is used, the data is copied and stored into the cache sidefile area and managed with a sequence number. In accordance with the present invention, the primary storage 2 performs the task of preserving the write order of the data to be remotely copied.

FIG. 11A shows additional detail for step 1004 of FIG. 11. The primary storage 2 determines in a step 1501 whether there is data to be remotely copied to the secondary storage 4. If so, the oldest (earliest) data that is to be remotely copied is identified in a step 1502; e.g., the data having the oldest sequence number. In a step 1503, the data is then written to the virtual volume. A loop in step 1504 is executed until the write operation is complete. If a timeout occurs, then a suitable error handler is executed in a step 1505. A timeout might occur if an error occurs at the secondary storage 4, for example. If the write operation successfully completes, then processing continues with step 1501 where another determination is made whether there is data to remote copied to the secondary storage 4.

Heartbeat

In the remote mirroring method, the secondary site (e.g., secondary host 3, secondary storage 4) takes over the process of the primary site (e.g., primary host 1, primary storage 2) when the primary site fails. To detect failure in the primary site from the secondary site, a heartbeat mechanism is often used. In the present embodiment, two kinds of heartbeat mechanisms are used.

A heartbeat signal is provided between the primary host 1 and the secondary host 3 via LAN 5. Each host periodically sends a heartbeat signal to the other. If the signal from the primary host 1 is not received by the secondary host 3 during a period of time, it indicates that the primary host 1 has failed. Likewise, if a heartbeat signal from the secondary host 3 is not received by the primary host 1 during a period of time, it indicates a failure in the secondary host 3.

A heartbeat signal is provided between the primary storage 2 and the secondary storage 4 via Fibre Channel cable 7. The primary storage 2 periodically writes a heartbeat data to a specific logical device (heartbeat device 422 in FIG. 2 or FIG. 3) contained in the secondary storage 4. In the present embodiment, the heartbeat data contains a timestamp. But in another embodiment, other heartbeat data such as sequential numbers can be used. The copy manager 35 periodically reads the heartbeat device 422 to retrieve the heartbeat data. If the heartbeat is the same as the previously read heartbeat data, then that indicates a failure in the primary storage 2.

Failover Process Flow

Figure 12:
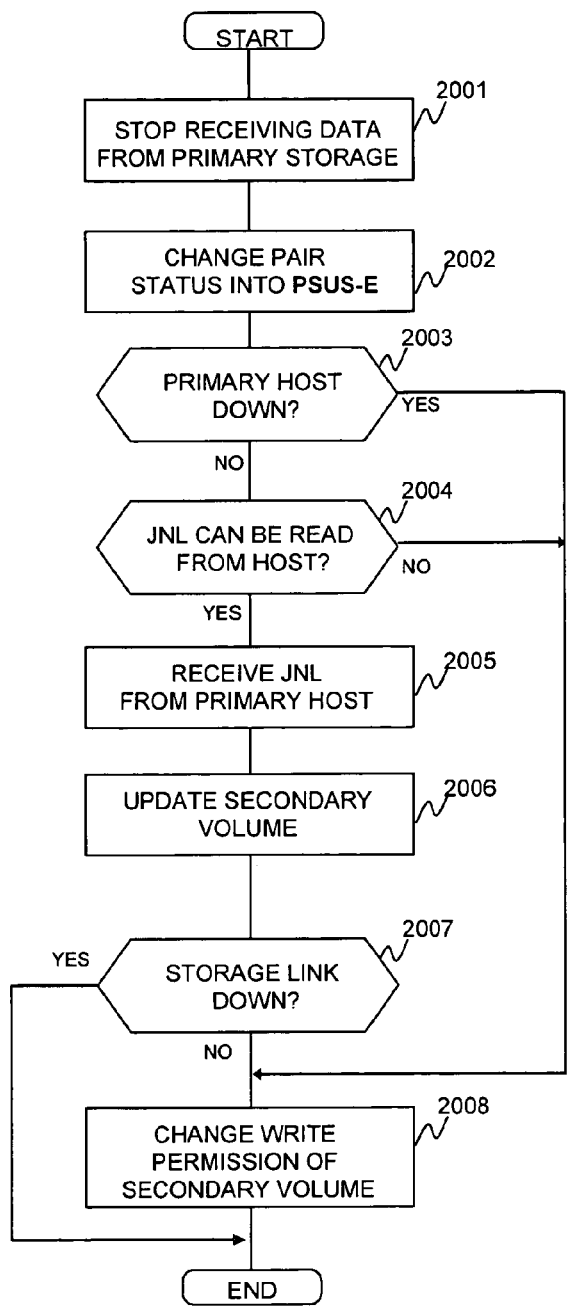
FIG. 12 highlights actions taken when a failure in the primary site is indicated.

FIG. 12 shows the flow of operation when the primary storage 2 or the primary host 1 fails. The process starts when the copy manager 35 in the secondary host 3 detects an indication of a failure in the primary host 1 or primary storage 2. The copy manager 35 can detect the following failure modes of the primary site (primary host 1, primary storage 2):

Primary site (both host and storage), or primary host failure: Since copy managers 15 and 35 transfer heartbeat signals periodically between each other, when the heartbeat from the copy manager 15 to the copy manager 35 ceases, it indicates a failure in the primary host 1 or the entire primary site.

Primary storage failure or link between the primary and secondary storage failure (but primary host is still alive): When the copy manager 35 periodically receives the heartbeat data but the heartbeat information from the primary storage 2 stops, it indicates a failure in the primary storage or link (Fibre Channel cable 7) failure. When there is a link failure, the secondary site does not take over the processing of the primary site.

FIG. 12 shows the process flow during failover processing that is performed by the copy manager 35:

Step 2001: The copy manager 35 detects an indication of a failure at the primary site. When a failure indication is detected, the copy manager 35 prevents the secondary storage 4 from receiving further write data from the primary storage 2 by changing the MODE 355 of the secondary volume configuration table 350. This process is performed to prevent data in the primary storage from flowing into the secondary storage by accident in a situation where the primary host is down but the primary storage is alive.

Step 2002: The pair status of the volume pair is set to PSUS-E.

Step 2003: If the indication is that the primary host 1 has failed, then processing proceeds to step 2008; otherwise processing proceeds to step 2004.

Step 2004: The copy manager 35 checks if the journal volume can be read from the primary host 1. For instance, the journal volume can be read by the copy manager 35 via the primary host 1 if only the primary volume fails or the Fibre channel cable 7 is disconnected.

Step 2005: The copy manager 35 instructs the copy manager 15 to read the contents of the journal volume. The copy manager 15 sends the journal to the copy manager 35.

Step 2006: The copy manager 35 updates the secondary storage volume using the received journal. Before updating the secondary storage volume, the copy manager 35 temporarily allows the secondary storage 4 to receive write data from the secondary host 3. After completing the update, the copy manager 35 prevents the secondary storage 4 from receiving write data from the primary host 3. Steps 2004 to 2006 serve generally to synchronize the secondary storage 4 with data in the primary storage 2; and in particular to synchronize data in the primary storage 2 that was intended to be mirrored to the secondary storage 4. In this particular embodiment, the journal information is used to perform the data synchronization.

Step 2007: If the cause of failure is a link failure, the process ends. If it is not, then the process proceeds to step 2008.

Step 2008: The copy manager 35 turns the write permission of the secondary storage volume ON. In this particular embodiment, the MODE field 355 for the volume in the secondary volume configuration table 350 is set to "1". This allows application programs in the secondary host 3 to access (read/write) the secondary volumes so that the applications can execute in the secondary host 3 to take over the tasks of the primary host 1 in the case where the primary host has failed.

Failback Process Flow

Figure 13:
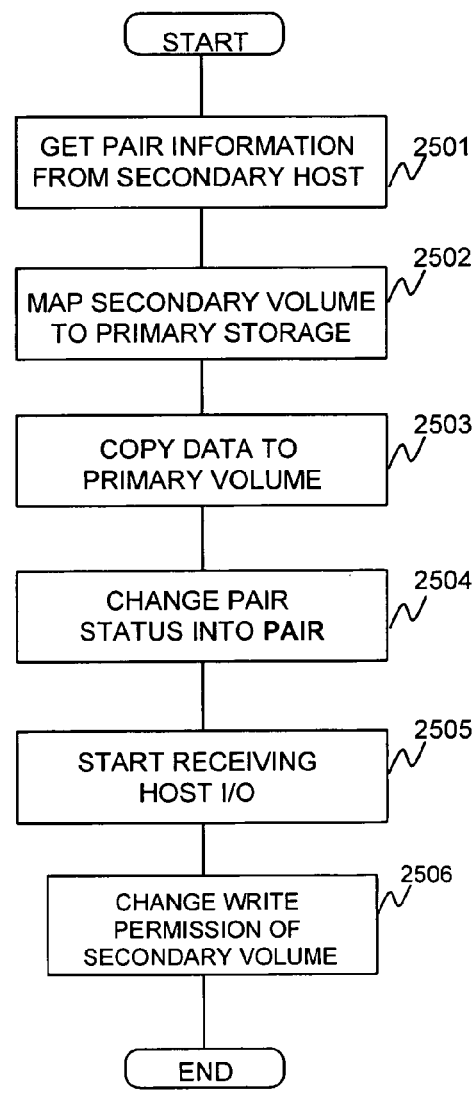
FIG. 13 highlights actions taken for failback processing.

When the primary site recovers from a failure, the tasks that run in the secondary site are reverted to the primary site. This is called "failback." FIG. 13 shows the actions for failback processing that the copy manager 15 in the primary host 1 performs:

Step 2501: Copy manager 15 retrieves the pair configuration table 600 from the copy manager 35.

Step 2502: To migrate (copy) data from the secondary storage 4 to the primary storage 2, the copy manager 15 instructs the primary storage 2 to create one or more virtual volumes to map the volumes in the secondary storage 4 that contain the data that is to be mirrored.

Step 2503: The copy manager 15 copies the contents of the virtual volume(s) that were created at step 2502 to the LDEVs of the primary storage 2. In the present embodiment, the copy operation is done by the copy manager 15, instructing the copy operation from the virtual volume to the internal volume in the primary storage 2. Or in another embodiment, the copy manager 35 may read the contents of the virtual volume, transfer the contents to the copy manager 15, and the copy manager 15 may write the contents back to the internal volume in the primary storage 2. In the former embodiment, the copy manager simply instructs the primary storage to perform the operation of copying data (i.e., the copy manager itself does not copy data). In the latter embodiment, the copy manager (primary and secondary) performs the read, transfer, and write data operations.

Step 2504: The copy manager 15 changes the pair configuration table 600 from the PSUS-E to PAIR. At the same time, the copy manager 15 instructs the primary storage system 2 to set the pair status of the internal volume and the virtual volume (internal volume is set to "primary volume", and the virtual volume is set to "secondary volume"). Further, copy manager 15 instructs the copy manager 35 to change the pair status of the volume pair into "PAIR".

Step 2505: The primary volume starts receiving host I/Os.

Step 2506: The copy manager 35 turns the write permission of the secondary storage volume OFF. In this particular embodiment, the MODE field 355 for the volume in the secondary volume configuration table 350 is set to "0". This prevents application programs in the secondary host 3 from accessing the secondary volumes.

When Secondary Site Fails

When the secondary site fails, the primary site must stop sending data to the secondary storage 4, regardless of whether the failure occurs in the secondary host 3 or in the secondary storage 4. In conventional systems, the secondary storage 4 can perform failover processing of a failure at the primary site even if the secondary host 3 has failed. By comparison, the advantages of the present invention are achieved with the requirement that failover processing of a failure at the primary site requires that the secondary host 3 be alive. Consequently, if the secondary host 3 suffers a failure, then the copy manager 15 in the primary host 1 would detect that failure and instruct the primary storage 2 to stop remote mirroring.

In case of a failure in the secondary storage 4, the primary storage 2 can detect the failure and stop remote mirroring. When the copy manager 15 inquires the status of the remote mirroring, the primary storage 2 tells the copy manager 15 that a failure in the secondary storage 4 is indicated.

Figure 14:
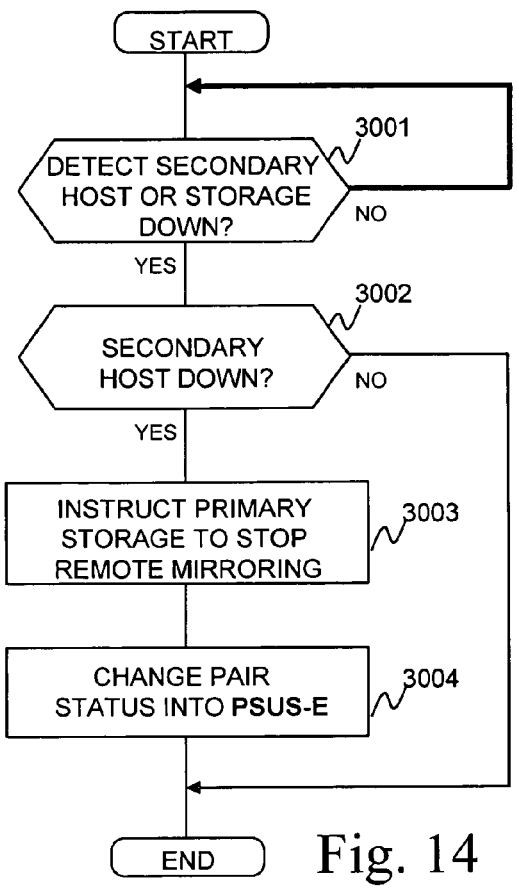
FIG. 14 highlights processing performed when a failure at the secondary site is indicated.

FIG. 14 shows the process flow of the copy manager 15 when it detects the failure of the secondary host 3 or the secondary storage 4.

Step 3001: The process starts when the copy manager 15 detects an indication of a failure in the secondary host 3 or when the copy manager 15 receives information from the primary storage 2 that the secondary storage 4 indicates a failure. If failure is detected, process proceeds to step 3002.

Step 3002: The process checks if the failure indication is from the secondary host 3 or the secondary storage 4. If failure is indicated in the secondary host 3, process proceeds to step 3003. If the failure is indicated in the secondary storage 4, the process ends.

Step 3003: The copy manager 15 instructs the primary storage 2 to stop the remote mirroring process. When the primary storage 2 receives the instruction, it initiates the process that is described in FIG. 15, which is described later.

Step 3004: The copy manager 15 changes the pair configuration table 600 in the primary host 1 into PSUS-E.

Figure 15:
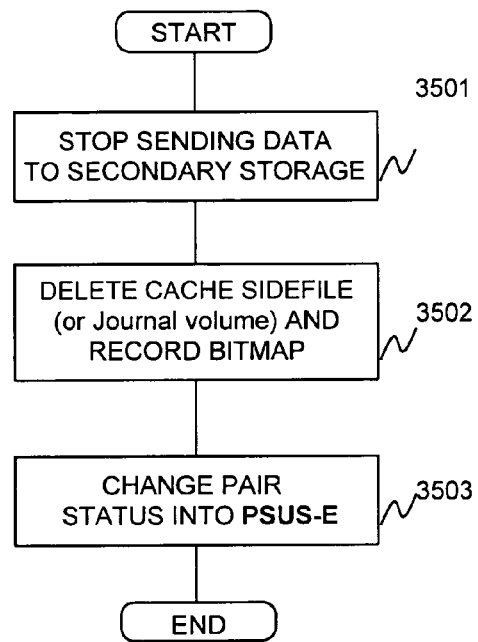
FIG. 15 highlights actions taken when a failure at the secondary storage is indicated.

FIG. 15 shows the process flow of the primary storage 2 when it detects the failure of the secondary storage 4 or when it is instructed from the primary host 1 to stop remote mirroring.

Step 3501: The mirror process is stopped; data is no longer mirrored to the secondary storage 4.

Step 3502: When the cache sidefile (or journaling) method is used for mirroring volume, the mirror process checks the cache sidefile if there is write pending data (i.e., data that has not been sent to the secondary storage). If the write pending data exists, the mirror process records the address (LBA) information of the write pending data. This recording operation is performed so that data mirroring can be re-established when the secondary host 3 or the secondary storage 4 recovers. The typical method of recording the address information of write pending data is to use a bitmap technique. Typical bitmap techniques to record write pending data address information are described in U.S. Pat. No. 5,544,347 or U.S. Pat. No. 6,092,066, each of which is incorporated by reference for all purposes. Thus, when a write operation is issued from the primary host 1 to the primary volume, the data is not sent to the secondary storage 4. Instead, the address information is recorded to the bitmap.

Step 3503: The disk controller 20 changes the pair volume status into PSUS-E. During the time while the pair volume status is PSUS-E, when the primary host 1 writes data to the primary volume, the write data is only written to the primary volume but is not stored to the cache sidefile or journal volume. Instead, the primary storage 2 records the data location where the data is written, as discussed above.

After Secondary Site Recovers

Figure 16:
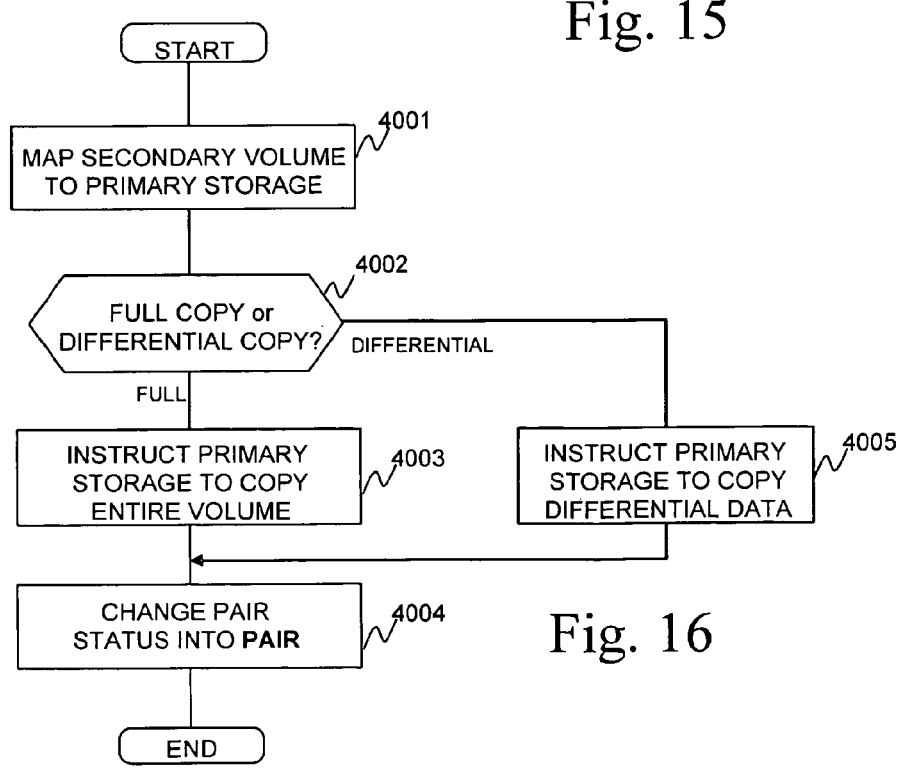
FIG. 16 highlights processing done for failback processing.

FIG. 16 shows the process flow when recovering from the secondary site failure or link failure. The process starts when users instruct copy manager 15 to restart the remote mirroring process.

Step 4001: The copy manager 15 instructs the primary storage 2 to create one or more virtual volumes mapped to secondary volumes in the secondary storage 4. Generally, specifying the secondary volume(s) is performed manually by the user. But in another embodiment, if the cause of the failure is because of link failure, the copy manager 15 can specify the secondary volume(s) by referring to the configuration in the virtual volume configuration table 500.

Step 4002: If the entire primary volume is to be copied, processing proceeds to step 4003. If only data that had not been sent to the secondary storage 4 (hereinafter, it is called "differential data") is to be copied, the process branches to step 4005. The determination is done by the user in the present embodiment. For example, in case of link failure, since the point in time of copy is preserved in the secondary storage 4, only differential data needs to be sent. In another embodiment, the determination can be done automatically if the copy manager 15 and 35 can detect a point in time where the copy is preserved in the secondary storage 4.

Step 4003: The copy manager 15 instructs the primary storage 2 to copy entire volume.

Step 4004: The copy manager 15 instructs the primary storage 2 to change the pair status into "PAIR." The pair configuration table 600 in the copy manager 15 is updated accordingly. After this step, when the primary host 1 writes data to the primary volume, the write data will be mirrored to the secondary volume.

Step 4005: The copy manager 15 instructs the primary storage 2 to copy differential data. Since the primary storage 2 records data location information that had not been sent to the secondary volume, the primary storage 2 sends differential data in accordance with the recorded data location information.

The foregoing discloses a storage system and method that is suitable for a remote mirroring system that is composed of different kinds of storage systems.

What is claimed is:

1. A storage system comprising:
a first storage system;
a second storage system;
a plurality of first physical storage devices located in the first storage system;
a plurality of second physical storage devices located in the second storage system; and
a first controller in the first storage system operative to:
store information about first logical devices and second logical devices, the first logical devices being mapped to the first physical storage devices, the second logical devices being mapped to the second physical storage devices;
receive a write request containing write data;
store the write data in one or more of the first logical devices;
generate sequence information indicative of the sequence by which the write data is written to the first logical devices, thereby preserving the write order of data written to the first logical devices;
send the write data to the second storage system in accordance with the sequence information such that the write data is stored in one or more of the second logical devices absent write-order determination by the second storage system;
receive information from the second storage system about first logical devices and second logical devices following a failure of the first storage system;
determine data to be mirrored and one or more second logical devices at which the data to be mirrored is stored based upon the information received from the second storage system;
create a virtual volume corresponding to each of the one or more second logical devices at which the data to be mirrored is stored;
initiate a copy operation through which the data to be mirrored is copied from each virtual volume to a first logical device at the first storage system; and
update the information about first logical devices and second logical devices when the copy operation is successfully completed.

2. A storage system comprising:
a first storage system;
a second storage system;
a plurality of first physical storage devices located in the first storage system;
a plurality of second physical storage devices located in the second storage system; and
a first controller in the first storage system operative to:
store information about first logical devices and second logical devices, the first logical devices being mapped to the first physical storage devices, the second logical devices being mapped to the second physical storage devices;
receive a write request containing write data;
store the write data in one or more of the first logical devices;
generate sequence information indicative of the sequence by which the write data is written to the first logical devices, thereby preserving the write order of data written to the first logical devices;
send the write data to the second storage system in accordance with the sequence information such that the write data is stored in one or more of the second logical devices absent write-order determination by the second storage system;
detect a failure of the second storage system;
suspend sending the write data to the second storage system;
update the information about the first logical devices and second logical devices to indicate failure of the second storage system; and
remove pending write data that is stored in the one or more first logical devices but not sent to the second storage system when the failure is detected.

* * * * *